(12) United States Patent
Lin

(10) Patent No.: US 6,375,453 B1
(45) Date of Patent: Apr. 23, 2002

(54) SYNCHRONOUS MOVING AND SEALING APPARATUS FOR A BLOW-MOLDED PRODUCT

(76) Inventor: Kun Wang Lin, No. 45, Kung Yieh 15th Road, Da-Li Industrial Park, Tai-Ping City, Taichung Hsien (TW)

(*) Notice: Subject to any disclaimer, the term of this patent is extended or adjusted under 35 U.S.C. 154(b) by 0 days.

(21) Appl. No.: 09/729,311

(22) Filed: Dec. 5, 2000

(51) Int. Cl.⁷ .................. B29C 49/10; B29C 49/42
(52) U.S. Cl. .................. 425/528; 264/531; 264/540; 425/529; 425/532
(58) Field of Search .................. 425/528, 529, 425/532, 169; 264/531, 540

(56) References Cited

U.S. PATENT DOCUMENTS

| | | | | |
|---|---|---|---|---|
| 3,504,396 A | * | 4/1970 | Button et al. | 425/532 |
| 3,585,262 A | * | 6/1971 | Nave et al. | 264/540 |
| 3,833,700 A | * | 9/1974 | Adomaitis | 425/532 |
| 4,340,345 A | * | 7/1982 | Schurman | 264/532 |
| 5,112,561 A | * | 5/1992 | Dickinson | 264/531 |
| 5,346,666 A | * | 9/1994 | Kanoh et al. | 264/540 |
| 5,474,734 A | * | 12/1995 | Akazawa et al. | 264/531 |

* cited by examiner

Primary Examiner—Robert Davis
(74) Attorney, Agent, or Firm—Rosenberg, Klein & Lee (57) ABSTRACT

A synchronous moving and sealing apparatus for a blow-molded product is disclosed. It mainly comprises a vertical moving mechanism and a sealing mechanism. The sealing mechanism has a clamping gear activator and two pulling rod activators with two pulling rods. The sealing mechanism and the plastic material will move down. The pulling rods and two clamping rods makes this edge closed approximately as a straight line and will seal the edge of the plastic material synchronously. So, a higher quality of the final blow-molded product is obtained and the safety of the operator is enhanced.

3 Claims, 10 Drawing Sheets

SYNCHRONOUS MOVING AND SEALING APPARATUS FOR A BLOW-MOLDED PRODUCT

BACKGROUND OF INVENTION

1. Field of the Invention

The present invention is related to a synchronous moving and sealing apparatus for a blowmolded product. More specifically, it is a synchronous moving and sealing apparatus for a blow-molded product. In which, a higher quality is obtained and the safety of the operator is enhanced.

2. Description of the Prior Art

Figure 12:
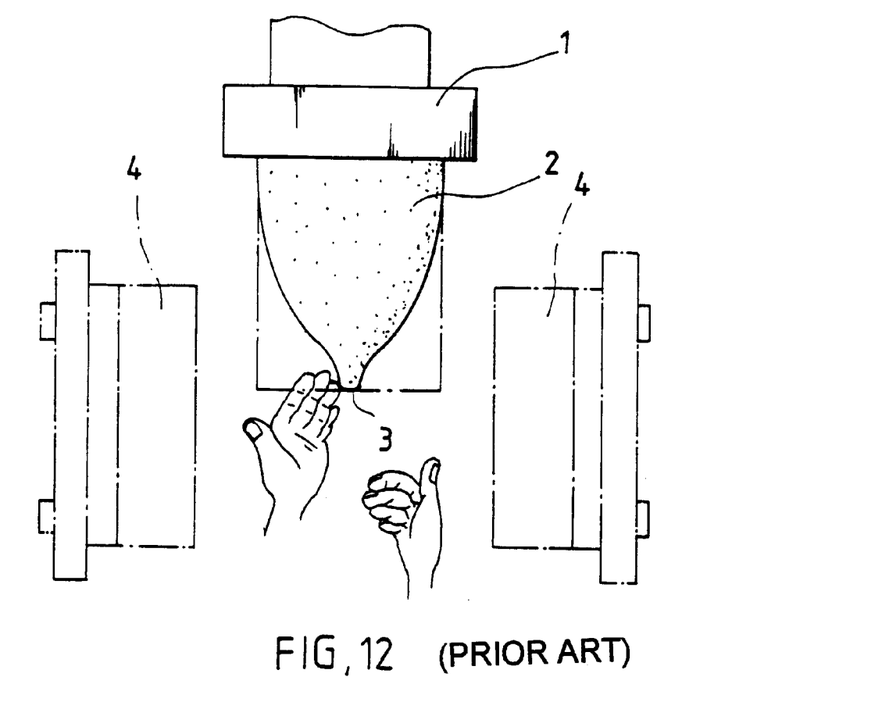
FIG. 12 shows a conventional sealing operation.
Figure 13:
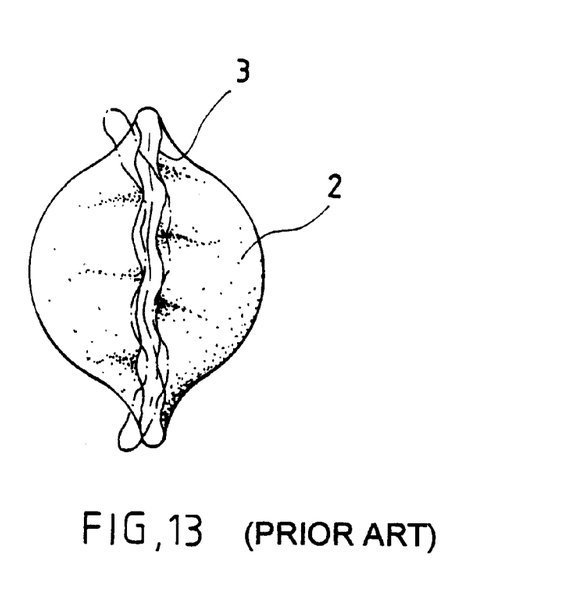
FIG. 13 is a bottom view of the sealed portion of the plastic material.

FIG. 12 shows a conventional sealing operation for a blow-molded product. In which, a tubular plastic material 2 is continuously fed from a blow-molded machine 1. An operator must uses his hands to pinch the circular edge 3 of the plastic material 2 into a line so that a hollow space is formed inside the tubular plastic material 2. When the plastic material 2 is continuously fed to a predetermined length. The operator will activate a set of molds 4 (on two sides of the plastic material 2) to press on the plastic material 2. Also, the blow-molded machine 1 will blow air into the molds 4. Therefore, a plastic blow-molded product is formed depending on the profiles of the inner cavities of the molds 4 (such as forming a tool box, toy, bottle, container, etc.). However, it is very dangerous to pinch on the edge 3 of the plastic material 2. The operator's hands might be injured. In addition, the line pinched by the operators hands is quite curvy and it usually is not parallel to the set of molds 4. Therefore, some portion of the final blow-molded product will be concentrated in too much material. Thus, this kind of product is a poor product to be eliminated. Also, the hand sealing action is very dangerous for the operator.

SUMMARY OF THE INVENTION

The primary object of the present invention is to provide a synchronous moving and sealing apparatus for a blow-molded product. In which, by using a sensor, the pulling rods will pull out the edge approximately as a straight line. And, the damping rods will seal the edge. Plus, the pulling rods and the clamping rods will synchronously move down to achieve a blow-molding procedure. So, the thickness of the feeding plastic material is uniform, the sealed edge and the molds are more parallel, the final product has no the concentrated portion for excessive material, and the safety of the operator is enhanced.

BRIEF DESCRIPTION OF THE DRAWINGS

Fig, 9 shows the sealing action.

DETAILED DESCRIPTION OF THE PREFERRED EMBODIMENT

Referring to FIGS. 1 to 4, the present invention is related to a synchronous moving and sealing apparatus for a blow-molded product. It mainly comprises a vertical moving mechanism 10 and a sealing mechanism 20.

The vertical moving mechanism 10 has a driving device 110 (a motor) with a output shaft for rotating an elevation rod 120 with threads via a belt member 111. Two guiding rods 130 are disposed at a suitable position.

Figure 1:
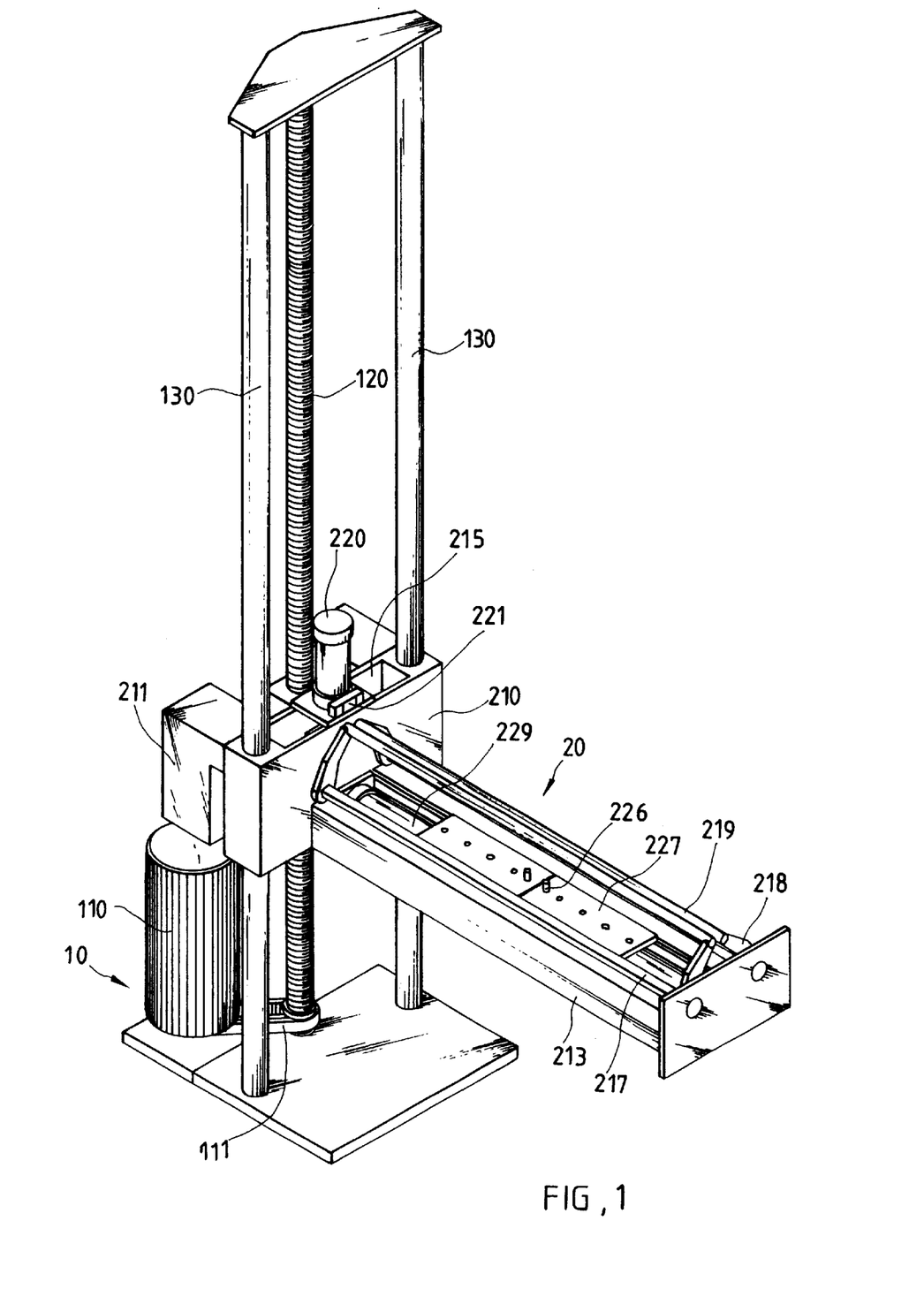
FIG. 1 is a perspective view of the present invention.
Figure 2:
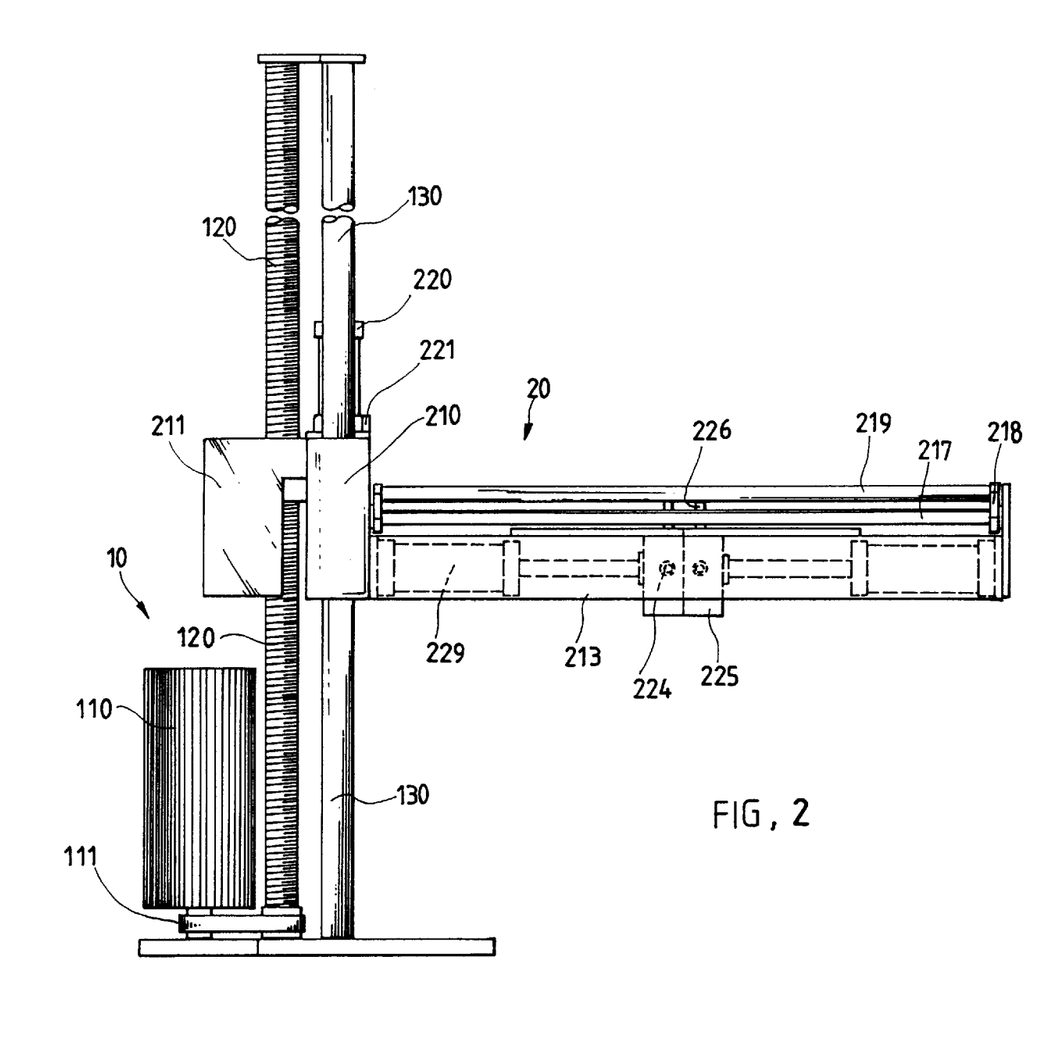
FIG. 2 is a front view of the present invention.
Figure 3:
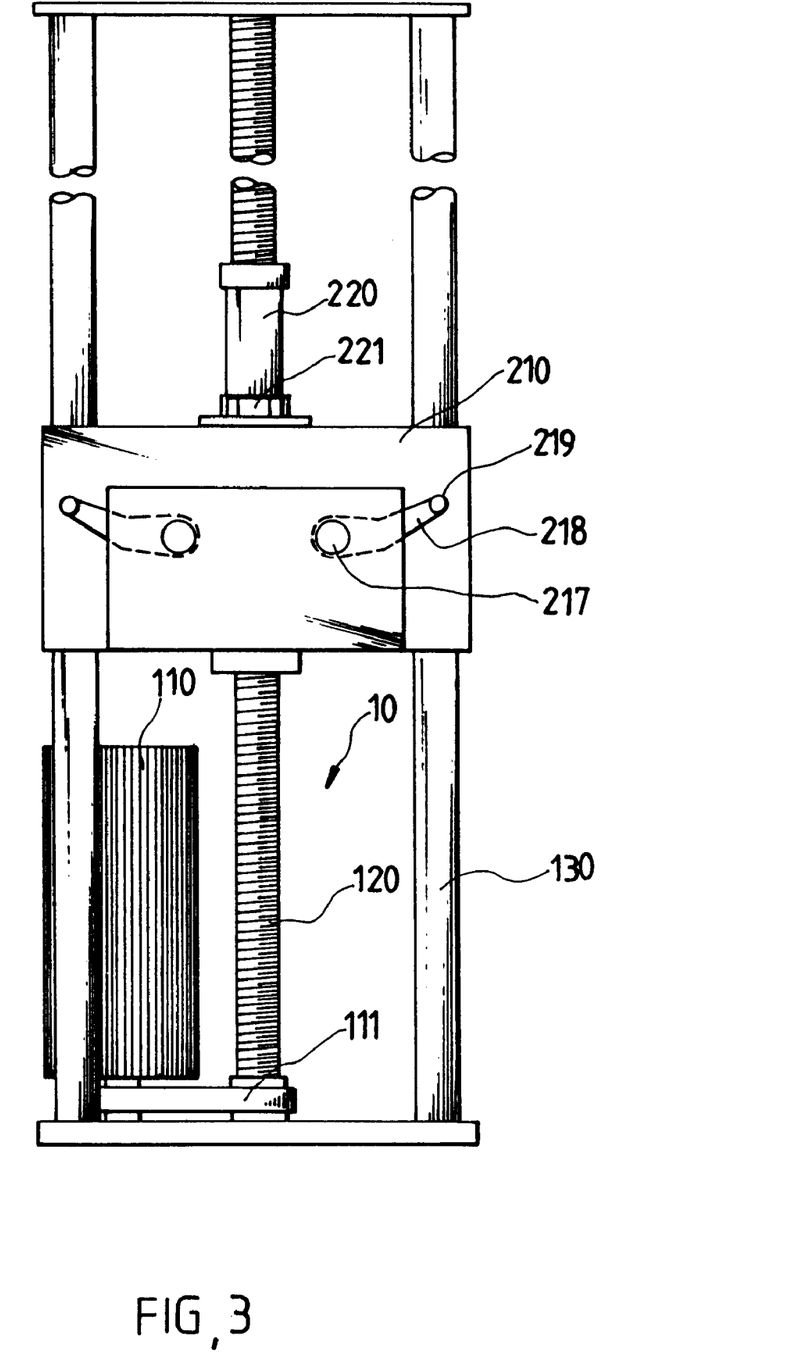
FIG. 3 is a side view of the present invention.
Figure 4:
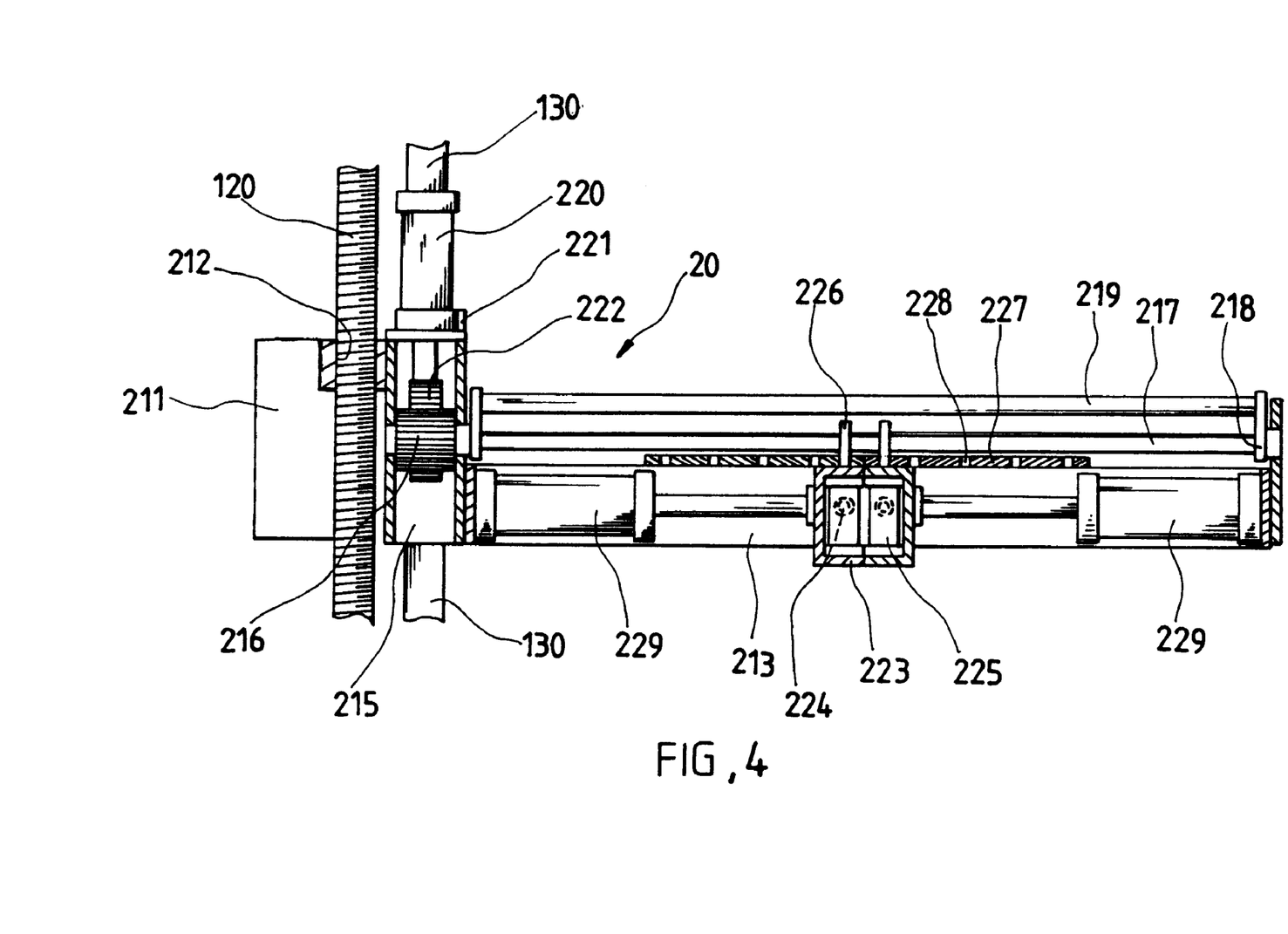
FIG. 4 is an enlarged cross-sectional view of a selected portion of the present invention.
Figure 5:
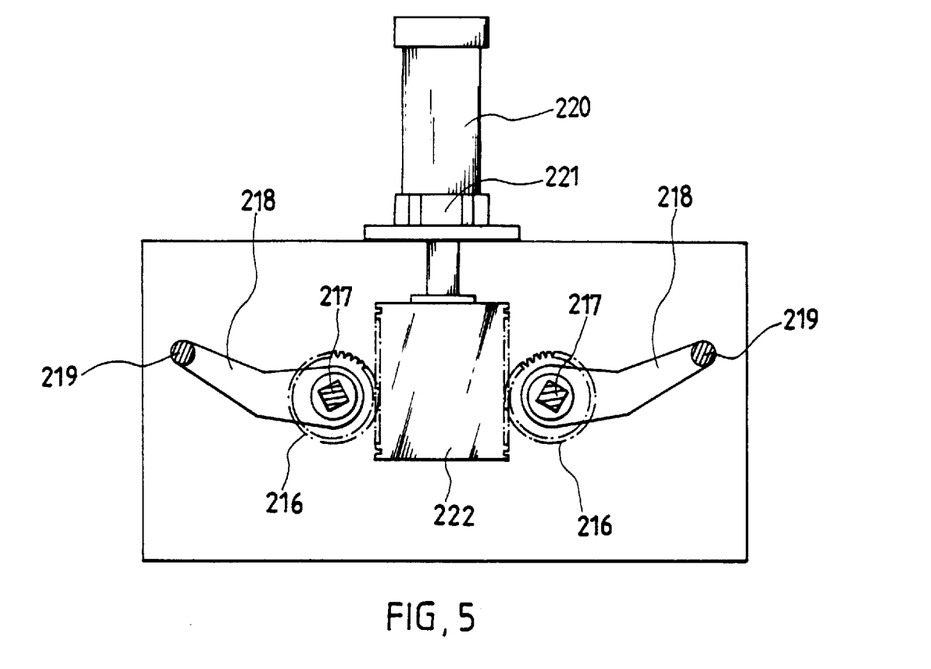
FIG. 5 is an enlarged view of a selection portion in FIG. 4.
Figure 6:
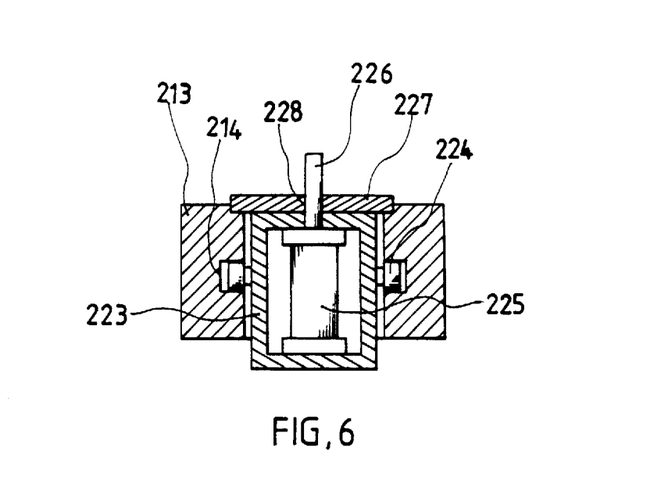
FIG. 6 is another enlarged view of a selected portion in FIG. 4.

The sealing mechanism 20 has a clamping gear activator 220 and two pulling rod activators 225 with two pulling rods 226. The sealing mechanism 20 contains a base 210. One end of the base 210 is disposed with two counter balance weights 211. The base 210 further has a thread hole 212 between these two counter balance weights 211. The other end of the base 210 integrally extends a pair of parallel frames 213. The inner sides of frames 213 have a pair of sliding slots 214. The base 210 further has a recess 215 beside the thread hole 212. There are two clamping gears 216 In the recess 215. Each clamping gear 216 extends out a rotating rod 217 as a central shaft and further connects a crank 218. These two cranks 218 are mounted with two parallel clamping rods 219 respectively. The clamping rod activator 220 is disposed above these two clamping gears 216. A sensor 221 is disposed near the clamping gear activator 220. The clamping gear activator 220 has a rack 222 to contact with these two clamping gears 216 (as shown In FIG. 5). Two opposite boxes 223 are disposed in the frames 213. The pulling rod activators 225 are mounted in these two boxes 223 respectively. A pair of rollers 224 is disposed on two opposite sides of each box 223. And, when two horizontal moving devices 229 are moved, the rollers 224 are rotated and moved along these two sliding slots 214 of the frames 213. Moreover, two positioning plates 227 are disposed on these two horizontal moving devices 229. Each of the positioning plate 227 has a plurality of positioning holes 226 for fixing the corresponding pulling rod 226 (as shown in FIG. 6).

Figure 7:
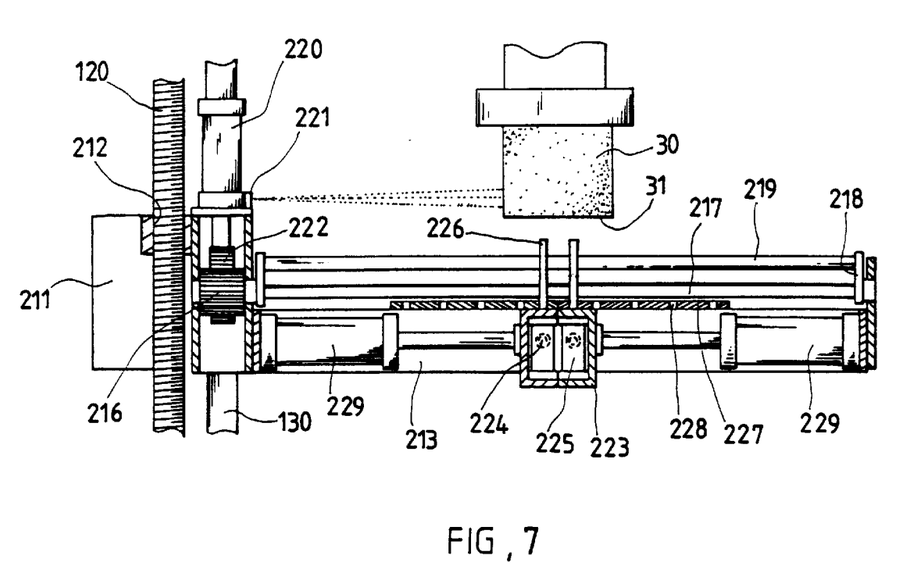
FIG. 7 shows the pulling rods moving upward.
Figure 8:
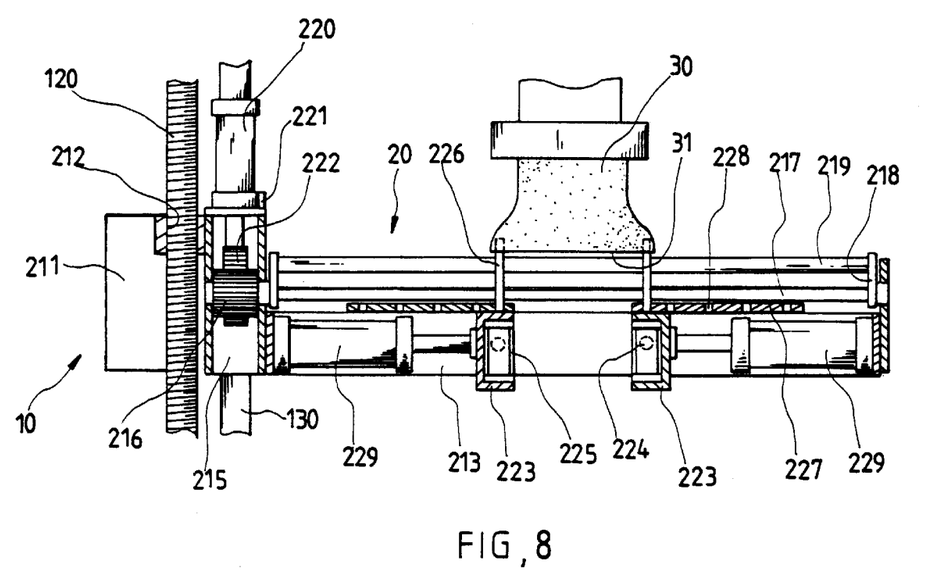
FIG. 8 shows the pulling rods moving outward horizontally.
Figure 9:
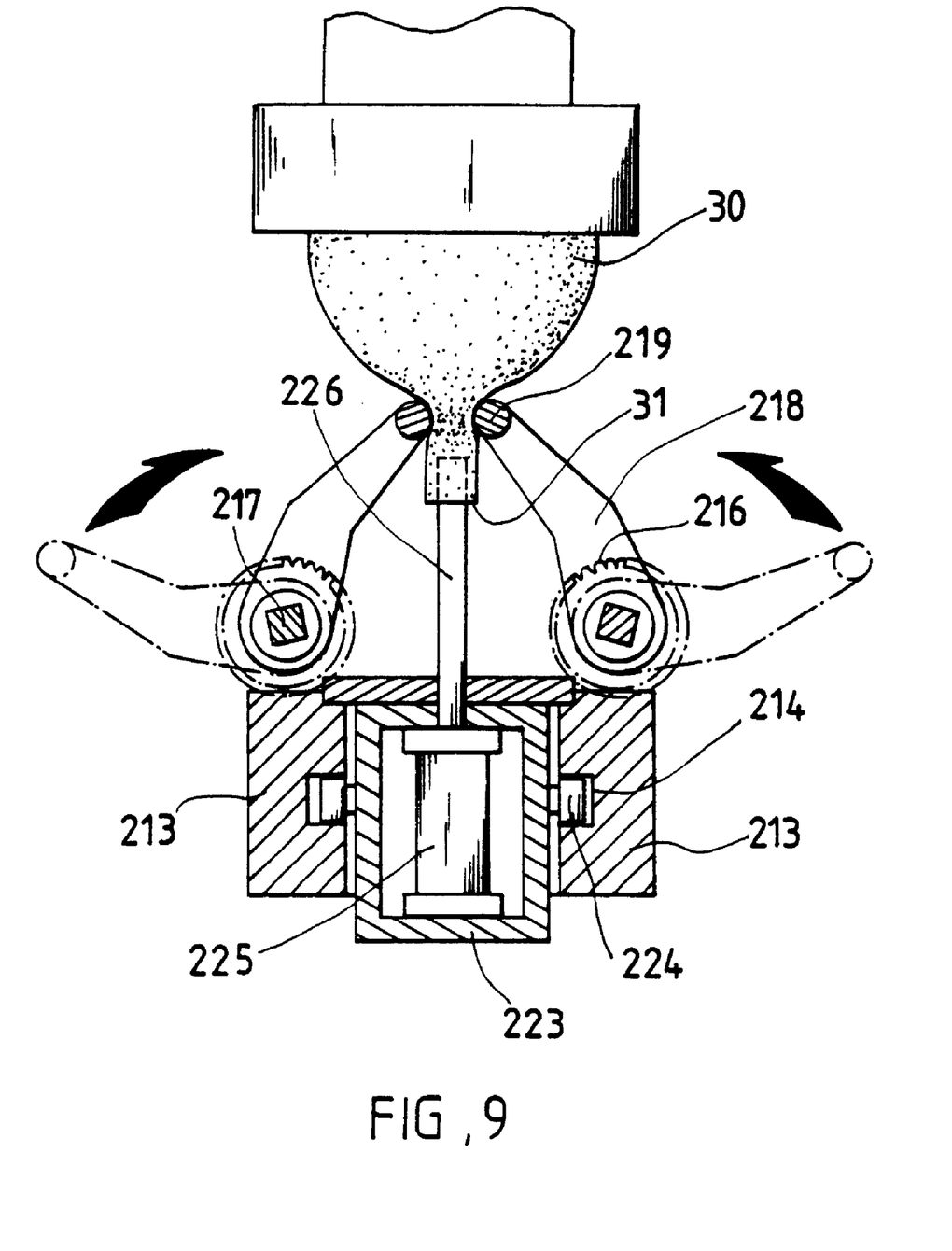
Figure 10:
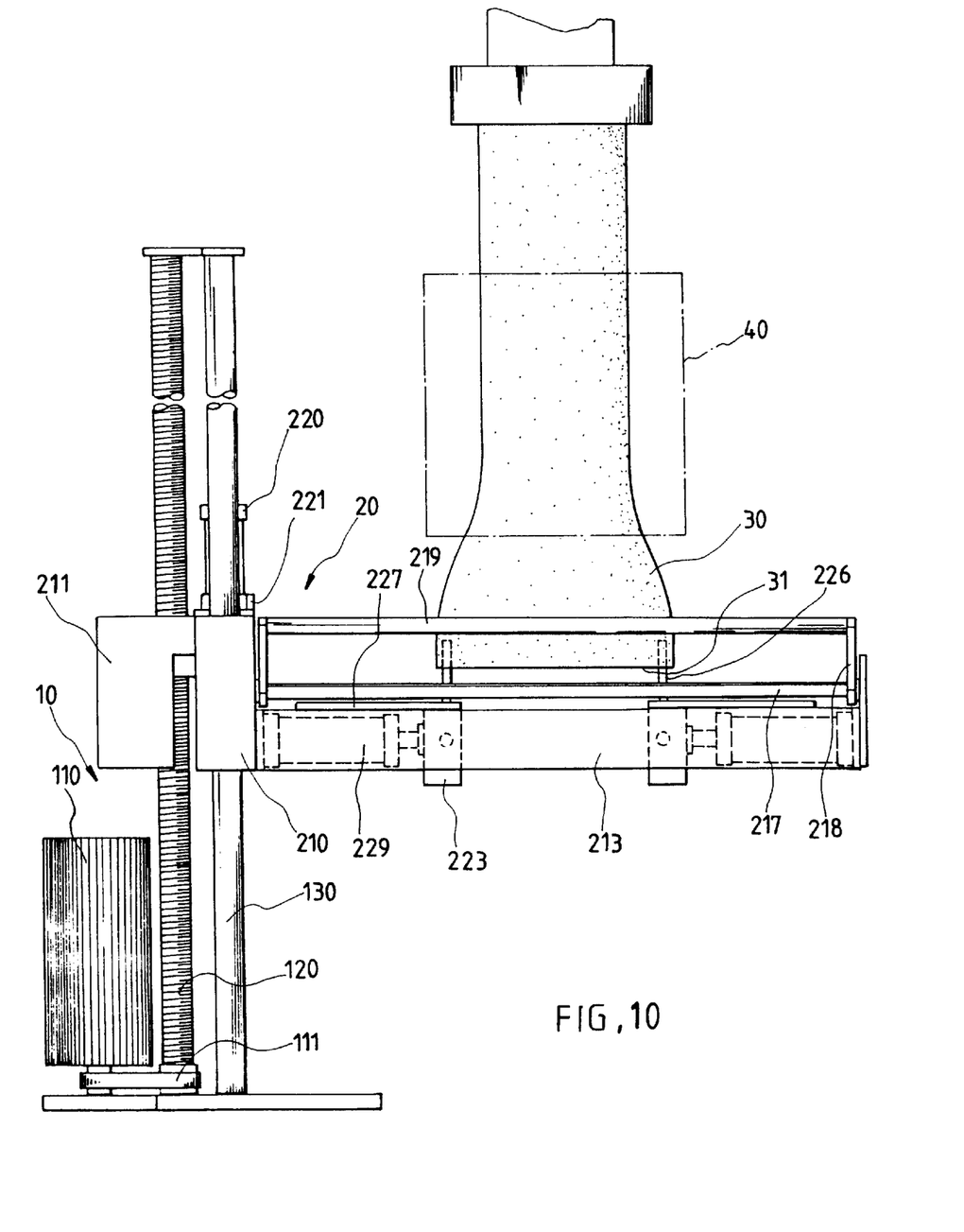
FIG. 10 shows the blow-molding procedure.
Figure 11:
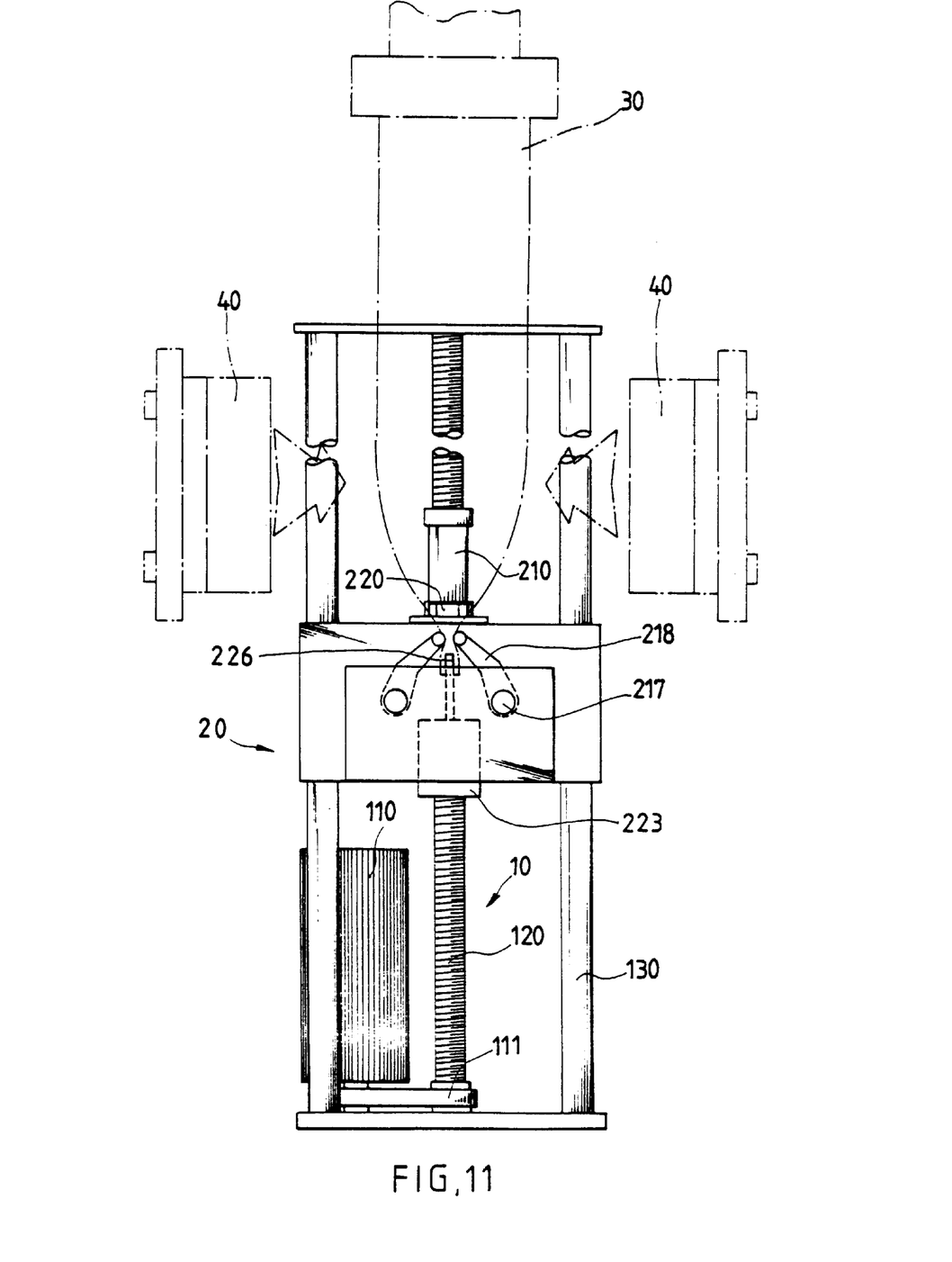
FIG. 11 is a side view for illustrating the blow-molded procedure.

When a tubular plastic material 30 is heated and fed from a blow-molded machine, the sensor 221 will detect it (shown in FIG. 7). So, the pulling rod activators 225 with two pulling rods 226 will move upward and protrude into the inner space of the circular edge 31 of the tubular plastic material 30. At this time, the driving device 110 also will drive the elevation rod 120 rotating via a belt member 111. Thus, the base 210 will be guided by the two guiding rods 130 to move down slowly. Simultaneously, the horizontal moving devices 229 will move outward horizontally so that the distance between these two pulling rods 226 is continuously increased. After which, it makes the edge 31 of the plastic material 30 gradually closed approximately as a straight line (as shown in FIG. 8). Then, the clamping gear activator 220 is activated to force the rack 222 to drive two clamping gears 216 rotating via the rotating rods 217 and cranks 218. Finally, this pair of parallel clamping rods 219 will press on a proper position near the edge 31 to seal this edge 31 in order to allow a set of molds 40 to press on (shown from FIGS. 9 to 11). Therefore, when it is clamping and sealing the edge 31 of the plastic material 30, the base 210 will synchronously move down slowly by the elevation rod 120 and the guiding rods 130. In addition, the counter balance weights 211 will enhance the stability during moving. Then, an operator can proceed the blow-molded forming procedure to form a blow-molded product. After the molds 40 are opened, the final product can be taken out. The base 210 will move up to the initial position for next plastic material 30 operation. Thus, the action for clamping and sealing the edge as well as the action for moving down the plastic material 30 are proceeding synchronously.

The position holes 228 on the position plates 227 are plural. Depending on the size of the edge 31 of the plastic material 30, the pulling rods 226 can be fixed on desired and suitable positioning holes 228. Therefore, it will save the time for the pulling rods 226 to move to reach the plastic material 30 and to increase the economic efficiency.

Thus, the thickness of the feeding plastic material is uniform, the sealed edge and the molds are more parallel, the final product has no the concentrated portion for excessive material, and the safety of the operator is enhanced.

The above embodiments are only used to illustrate the present invention, not intended to limit the scope thereof. Many modifications of the above embodiments can be made without departing from the spirit of the present invention.

What is claimed is:

1. A synchronous moving and sealing apparatus for a blow-molded product comprising:

a vertical moving mechanism having a driving device for rotating an elevation rod;

a sealing mechanism having a clamping gear activator and two pulling rod activators with two pulling rods, a sensor being disposed adjacent said clamping gear activator, so that when a tubular plastic material having a lower circular edge is moved to a predetermined position, said two pulling rods of the two pulling rod activators will protrude into said lower circular edge of said tubular material and two horizontal moving devices are moved so as to make said edge closed approximately as a straight line; then, said damping gear activator is activated to force a rack to drive two clamping gears rotatingly and a pair of parallel clamping rods extending from said two clamping gears will seal said edge;

so that, by rotating said elevation rod, said sealing mechanism and said plastic material will move down and will seal said edge of the plastic material synchronously.

2. A synchronous moving and sealing apparatus for a blow-molded product as claimed in claim 1, wherein each pulling rod activator is mounted in a box, a pair of rollers are disposed on two opposite sides of said box, and when said the horizontal moving devices are moved, said rollers are rotated and moved along two sliding slots.

3. A synchronous moving and sealing apparatus for a blow-molded product as claimed in claim 1, wherein two positioning plates are disposed on said two horizontal moving devices, each of said positioning plate has a plurality of positioning holes for fixing said corresponding pulling rod, so that a distance between these two pulling rods can be adjusted so as to fit a suitable plastic material.

\* \* \* \* \*